(12) United States Patent
Sutton

(10) Patent No.: US 7,045,085 B2
(45) Date of Patent: May 16, 2006

(54) ELASTOMER COMPOSITION AND METHODS FOR USING SAME

(76) Inventor: Stephen P. Sutton, 155 Avalon Ave., Elkton, MD (US) 21921

( * ) Notice: Subject to any disclaimer, the term of this patent is extended or adjusted under 35 U.S.C. 154(b) by 537 days.

(21) Appl. No.: 10/123,045

(22) Filed: Apr. 15, 2002

(65) Prior Publication Data

US 2003/0193116 A1 Oct. 16, 2003

(51) Int. Cl.
*B29C 47/80* (2006.01)
*B29C 71/02* (2006.01)

(52) U.S. Cl. .............. 264/210.6; 264/319; 264/327; 264/328.14; 264/328.16; 264/237; 264/211

(58) Field of Classification Search .......... 264/237, 264/319, 327, 328.14, 328.16, 210.6, 211
See application file for complete search history.

(56) References Cited

U.S. PATENT DOCUMENTS

| | | | |
|---|---|---|---|
| 4,069,359 A | 1/1978 | DeMarse et al. | |
| 4,178,337 A | 12/1979 | Hall et al. | |
| 4,216,302 A | 8/1980 | Skillicorn | |
| 4,344,873 A | 8/1982 | Wick | |
| 4,369,284 A | 1/1983 | Chen | |
| 4,431,598 A | 2/1984 | Korpman | |
| 4,798,853 A | 1/1989 | Handlin, Jr. | |
| 4,820,590 A | 4/1989 | Hodgson, Jr. et al. | |
| 4,886,865 A | 12/1989 | Ikeno et al. | |
| 5,212,211 A | 5/1993 | Welch, II et al. | |
| 5,262,468 A | 11/1993 | Chen | |
| 5,334,646 A | 8/1994 | Chen | |
| 5,476,712 A | 12/1995 | Hartman et al. | |
| 5,491,012 A | 2/1996 | Lühmann et al. | |
| 5,508,334 A | 4/1996 | Chen | |
| 5,508,337 A | 4/1996 | Wamprecht et al. | |
| 5,608,028 A | 3/1997 | Sanftleben et al. | |
| 5,618,883 A | 4/1997 | Plamthottam et al. | |
| 5,633,341 A | 5/1997 | Abend | |
| 5,672,402 A | 9/1997 | Kreckel et al. | |
| 5,729,963 A | 3/1998 | Bird | |
| 5,738,930 A | 4/1998 | Huskey | |
| 5,844,047 A | 12/1998 | Abend | |
| 5,863,977 A | 1/1999 | Fischer et al. | |
| 5,994,450 A | 11/1999 | Pearce | |
| 6,005,041 A | 12/1999 | Cook | |
| 6,033,776 A | 3/2000 | Huddleston et al. | |
| 6,071,454 A * | 6/2000 | Shimizu et al. ............ | 264/250 |
| 6,171,681 B1 | 1/2001 | Mascarenhas et al. | |
| 6,187,696 B1 | 2/2001 | Lim et al. | |
| 6,368,444 B1 | 4/2002 | Jameson et al. | |

OTHER PUBLICATIONS

Description of KRATON® Polymers by David R. Hansen, Earle E. Ewins, and David J. St. Clair of Shell Chemical (38 pages).

"KRATON® Thermoplastic Rubbers in oil gels," *Technical Bulletin*, Shell Chemical Company (9 pages).

(Continued)

*Primary Examiner*—George Koch
(74) *Attorney, Agent, or Firm*—Dority & Manning, P.A.

(57) ABSTRACT

A bench-top molding process is disclosed in combination with an apparatus designed to heat a molding composition. In accordance with the present invention, the molding composition contains a thermoplastic elastomer and a plasticizer. The thermoplastic elastomer can be, for instance, a styrene-ethylene/butylene-styrene block copolymer. The plasticizer, on the other hand, can be mineral oil. The block copolymer can be chosen in conjunction with the plasticizer so as to have a bubble rise rate when heated equal to at least one half of the bubble rise rate of glycerin at room temperature. By having a bubble raise rate in the above range, it has been found that no significant amounts of air will be trapped in the molding composition when formed into a casting.

23 Claims, 3 Drawing Sheets

OTHER PUBLICATIONS

KRATON® D and G Polymer Series Compounds Descriptive Bulletin (21 pages).

KRATON® Polymers Publication from Shell Chemical.

"The Influence of Thermoplastic Elastomers On Morphological and Mechanical Properties of PP/TALC Composite," in *Acta Chim. Slov.* 1999, 46(1), by Matjaž Denac and Vojka Musil (pp. 55–67).

Sutton, et al. U.S. Appl. No. 10/113,907, filed Mar. 29, 2002, Spirally Wound Packages of Soft Thermoplastic Elastomer Tape, Film or Sheet and Processes for Producing Same.

Product Information of Rigidcast Shore D Casting Urethanes, BNB Enterprises, 3 pages, www.bjbenterprises.com, Jan. 10, 2002.

Product Information on Shore A Polyurethanes, BJB Enterprises, 3 pages, www.bjbenterprises.com, Jan. 10, 2002.

Product Information on Silicone Casting Rubbers, BJB Enterprises, 1 page, www.bjbenteriprises.com, Jan. 10, 2002.

Product Information on Waxes, The Kindt–Collins Company, 1 page, www.kindt–collins.com, Jan. 10, 2002.

Product Information on Investment Casting Waxes, The Kindt–Collins Company, 3 pages, www.kindt–collins.com, Jan. 10, 2002.

Information of PTE Distribution, Inc., 2 pages, www.pte-distribution.com, Jan. 21, 2002.

Product Information on Addition Cure (Platinum) Products, *SILASTIC* Brand Silicone Rubbers, PTE Distribution, 2 pages, www.ptedistribution.com, Jan. 10, 2002.

Product Information on Condensation Cure (Tin) Products, *HS & 3100* Brand Silicone Rubbers, PTE Distribution, 2 pages, www.pteidstribution.com, Jan. 10, 2002.

Product Information on Addition Cure (Platinum) Product, *BJB* Brand Silicone Rubbers, PTE Distribution, 2 pages, www.ptedistribution.com, Jan. 10, 2002.

Product Information on Polyurethane (Room or Oven Cure), PTE Distribution, 2 pages, www.ptedistribution.com, Jan. 10, 2002.

Product Information on Parts In Minutes™, PTE Distribution, 2 pages, www.ptedistribution.com, Jan. 10, 2002.

Information on TCS, Inc., 1 page, www.sculpt.com, Jan. 10, 2002.

Product Information on Pourable Semi–Rigid Polyurethane Casting Compounds from TCS, Inc., 3 pages, www.scultp.com, Jan. 10, 2002.

Product Information on Pourable Polyurethane Casting Compounds from TCS, Inc., 7 pages, www.sculpt.com, Jan. 10, 2002.

Product Information on Pourable Clear Polyurethane Casting Compounds from TCS, Inc., 3 pages, www.sculpt.com, Jan. 10, 2002.

* cited by examiner

ELASTOMER COMPOSITION AND METHODS FOR USING SAME

BACKGROUND OF THE INVENTION

A wide range of applications exist for materials which can be manually molded in liquid form and quickly converted into flexible elastomeric articles. Particularly in prototype and artistic work, there is a common need to quickly fabricate complex elastomeric forms using versatile bench top molding techniques. Often, refinement of artistic or technical concepts requires iterative fabrication trials to produce a desirable result, and methods are needed which are both cost effective and easy to implement. Liquid bench top molding techniques provide the necessary versatility, allowing immediate fabrication of complex forms from simple molds which can be quickly carved, machined, or cast.

Bench top molding, as used herein, is used to describe techniques which are primarily manual in nature, and involve pouring, setting, and removal of a final casting from a mold. Such techniques are differentiated from more advanced processes in that they normally do not include the application of pressure, centrifugation, vacuum, etc. to facilitate the formation of a void-free casting. Although any number of sophisticated processes exist for molding a wide range of materials, most are poorly suited to economical and immediate casting of specialty models, prototypes, props, etc., on a small scale basis.

While conceptually straightforward, the technical requirements for bench top moldable materials are stringent. Specifically, as the material is cast, it must be sufficiently fluidic to allow gravity filling of the mold and escape entrapped voids. In addition, it must, through some mechanism, subsequently undergo transition into a final, mechanically resilient, article. These requirements limit the scope of suitable options.

Given the enormous number of thermoplastic polymer resins available for injection/blow molding, extrusion, etc., it would seem that thermoplastic polymers would be well suited to forming bench top molds. On consideration, however, thermoplastic polymers with sufficient molecular weight to yield good mechanical properties, have characteristically high resistance to flow in the melt. Although deformable under high pressure (as in injection molding), typical thermoplastic resins are far too viscous for gravity pouring even at high temperature. Although there are some formulations which can be melt cast/poured into molds, fluidity is typically limited and centrifugation and/or vacuum degassing would be needed to eliminate void entrapment. Since bench top casting requires fluidity sufficient to insure gravity mold filling and elimination of entrapped voids, viable thermoplastic alternatives are severely constrained.

While some waxes produce a highly fluid melt which can be effectively bench-top molded, and such materials are sometimes used for prototype work, they do not possess the elasticity or mechanical integrity for important applications. The Knit-Collins Company of Cleveland, Ohio, for example, specializes in waxes for this type of application. Waxes, however, are notoriously brittle and soften at warm temperatures. Even for application in theatrical props, or most art forms, they can only be used with great care to avoid damage, fracture, and softening in warm environments.

Aside from waxes, very few materials exist which produce fluidic melts appropriate for bench-top casting. Although some exotic examples exist (such as low melt point metals like indium), these are, in general, rigid, expensive, and mechanically unacceptable for typical prototyping and artistic needs.

For all of these reasons, bench-top molding is most commonly performed using materials which are initially fluidic but experience chemical cross-linking in the mold. In general, several classes of such materials are now in common use. These include 1) epoxies, 2) acrylics, 3) polyurethanes, 4) silicones and 5) similar polymers which can be chemically crosslinked. Typically, such materials "cure" within the mold either due to a reaction between components mixed prior to curing, the application of heat to the material, or through a reaction with air and/or associated moisture.

A wide range of silicone and urethane compounds, specifically engineered and sold for bench-top casting, are commercially available. BJB Enterprises Inc., (Tustin, Calif.), for example, offers castable urethanes ranging form RC-8004FR (85 shore D hardness with 800 cps mixed viscosity) to LS-15 (15 shore A hardness with mixed viscosity of 275 cps). In addition, they offer castable silicone formulations ranging from TC-5005 (shore A hardness of 10) to TC-5050 (shore A hardness of 50).

While these materials are specifically engineered and sold for application in bench-top molding applications, they suffer a number of important drawbacks. Among these limitations, mechanical properties are of particular importance. The base polymers associated with these compounds have inherent characteristics which limit formulation of compositions which are both soft and mechanically durable (tough). As is well known to those skilled in the art, silicone materials become highly notch sensitive (splitty) as softness is increased and urethanes can become tacky and creep sensitive in low durometer forms. These difficulties make it problematic to formulate very soft compounds from these materials, as evidenced by the general lack of commercial materials with Shore A hardness under 10.

Beyond mechanical limitations, these materials also suffer from other drawbacks. Once cross-linked in a particular physical form, these materials cannot be reused or reprocessed since they have experienced fundamental chemical changes. In addition, these materials are typically difficult to remove once molded (due to the rigidity and sticking to mold surfaces), and are extremely expensive for many prototyping applications.

For all of these reasons, it is clear that a reusable composition which can be melted and gravity poured (or otherwise manually applied) to produce castings would have great utility and value.

DEFINITIONS

As used herein, the phrase "bubble rise rate" refers to the rate in inches per hour at which hollow spheres having a particular size rise in a pourable composition.

To calculate the bubble rise rate of a composition, 0.3 grams of hollow spheres are placed in a glass vial approximately 0.5 inches in diameter by 2.0 inches in height. The hollow spheres have a size between tyler equivalent 140 mesh and 200 mesh (106–75 microns). The hollow spheres are glass spheres, such as raw 3M SCOTCHLITE spheres (product number 10021068789) that have been screened to the above size range. As one skilled in the art will recognize, other rigid hollow spheres, having comparable size and apparent density, may be employed.

To perform a measurement of fluidity on a particular composition, the above glass vial is filled with the composition along with the spheres. The vial is left to equilibrate for approximately 30 minutes. The spheres are then thoroughly stirred into the fluid and another equilibrium period follows. The fluid is shaken in the vial for final mixing and poured into an identical vial. The vial is observed as the spheres within the fluid move upward from the bottom of the vessel. The time required for the resultant clearing front to move upwards a distance of 0.5 inches is measured and the corresponding drift speed calculated.

For molding compositions, the compositions need to be heated in order for the fluidity measurement to occur. In this instance, the hollow spheres and molding composition are mixed and heated together to a temperature sufficient for the molding composition to be pourable but insufficient to degrade the molding composition. For instance, when the molding composition contains a styrene-ethylene/butylene-styrene block copolymer, the molding composition and hollow spheres can be heated to a temperature of 175° C. Once heated, the procedure as above is followed. In order to prevent the composition from cooling, the second vial into which the composition and spheres are poured is preheated.

SUMMARY OF THE INVENTION

The present invention is generally directed to thermoplastic elastomer molding compositions with melt properties appropriate for bench-top casting, and mechanical properties which, in some cases, extend beyond the capabilities of existing urethane, silicone, or other options. In some embodiments, the compositions can include various materials which have a variety of options including a mechanism for pigmentation using very low cost techniques, along with complete recyclability (ability to be re-melted and molded over and over).

In general, the present invention is directed to a bench top molding process. The process includes the steps of providing a molding composition. The molding composition contains a thermoplastic elastomer and a plasticizer. The thermoplastic elastomer and plasticizer are chosen in selected amounts such that the molding composition, when heated to a temperature sufficient for the composition to be pourable but insufficient to thermally degrade the thermoplastic elastomer or plasticizer, has a bubble rise rate of greater than about 0.3 inches per hour. In some embodiments, the bubble rise rate of the molding composition is greater than about 0.5 inches per hour, and, in one embodiment, has a bubble rise rate of from about 0.7 inches per hour to about 3.0 inches per hour.

In accordance with the process of the present invention, the molding composition is heated to a temperature sufficient for the composition to be pourable. The molding composition is then poured into a mold to form a casting. Once poured into the mold, the casting is cooled and removed.

Once formed into the casting, the molding composition can have a shore A hardness of less than about 10, and particularly less than about 5. In one embodiment, the molding composition can have a shore A hardness of less than about 2, and in one particular embodiment, can have a shore A hardness of less than about 00.

The thermoplastic elastomer incorporated into the molding composition of the present invention can vary depending upon the particular application. For instance, the thermoplastic elastomer can be a styrene-ethylene/propylene-styrene block copolymer, a styrene-isoprene-styrene block copolymer, a styrene-butadiene-styrene block copolymer, a polyetherester, a polyurethane, an ethylene vinyl acetate, or mixtures thereof.

In one embodiment, the thermoplastic elastomer is a styrene-ethylene/butylene-styrene block copolymer. In this embodiment, the bubble rise rate can be measured at a temperature of about 175° C. The styrene-ethylene/butylene-styrene block copolymer can have a molecular weight of from about 100,000 to about 300,000 and can contain polystyrene in an amount from about 15% by weight to about 45% by weight.

Similar to the thermoplastic elastomer, the plasticizer can also vary depending upon the particular of application. For instance, in one embodiment, the plasticizer can be a napthanic oil. In an alternative embodiment, the plasticizer can be mineral oil. The amount of plasticizer present in the molding composition can vary widely depending upon the thermoplastic elastomer chosen and the desired end result. For many applications, however, the plasticizer can be present in the molding composition in an amount from about 60% by weight to about 95% by weight.

In one embodiment, the plasticizer and thermoplastic elastomer can be pre-compounded prior to being heated in accordance with the present invention. For example, the plasticizer and thermoplastic elastomer can be premixed into the form of pellets or blocks. In an alternative embodiment, the thermoplastic elastomer and plasticizer can be in the form of a tape which is heated and formed into a casting.

The temperature to which the molding composition is heated can vary. For example, when the molding composition contains a block copolymer, such as styrene-ethylene/butylene-styrene block copolymer, the molding composition can generally be heated to a temperature from about 150° C to about 180° C and then poured into a mold.

During heating, various volatile components can vaporize from the molding composition. In order to counteract this effect, the present invention is also directed to an apparatus for heating the molding composition. The apparatus can include a vessel for holding and heating the molding composition. The vessel can be made from metal or any other suitable material that can be heated by an open flame or by an electrical resistance heater. In accordance with the present invention, the vessel further includes a cooled lid. The lid, for instance, includes a cooling device that condenses vapors that are created during the heating process. The cooling device can be a plurality of fins that project from the outside surface of the lid. Alternatively, the cooling device can be a cooling fluid jacket formed into the lid. For example, in one embodiment, a plurality of channels can be formed into the lid through which a cooling fluid, such as cold water, can be circulated during heating.

Other features and aspects of the present invention are discussed in greater detail below.

Figure 1:
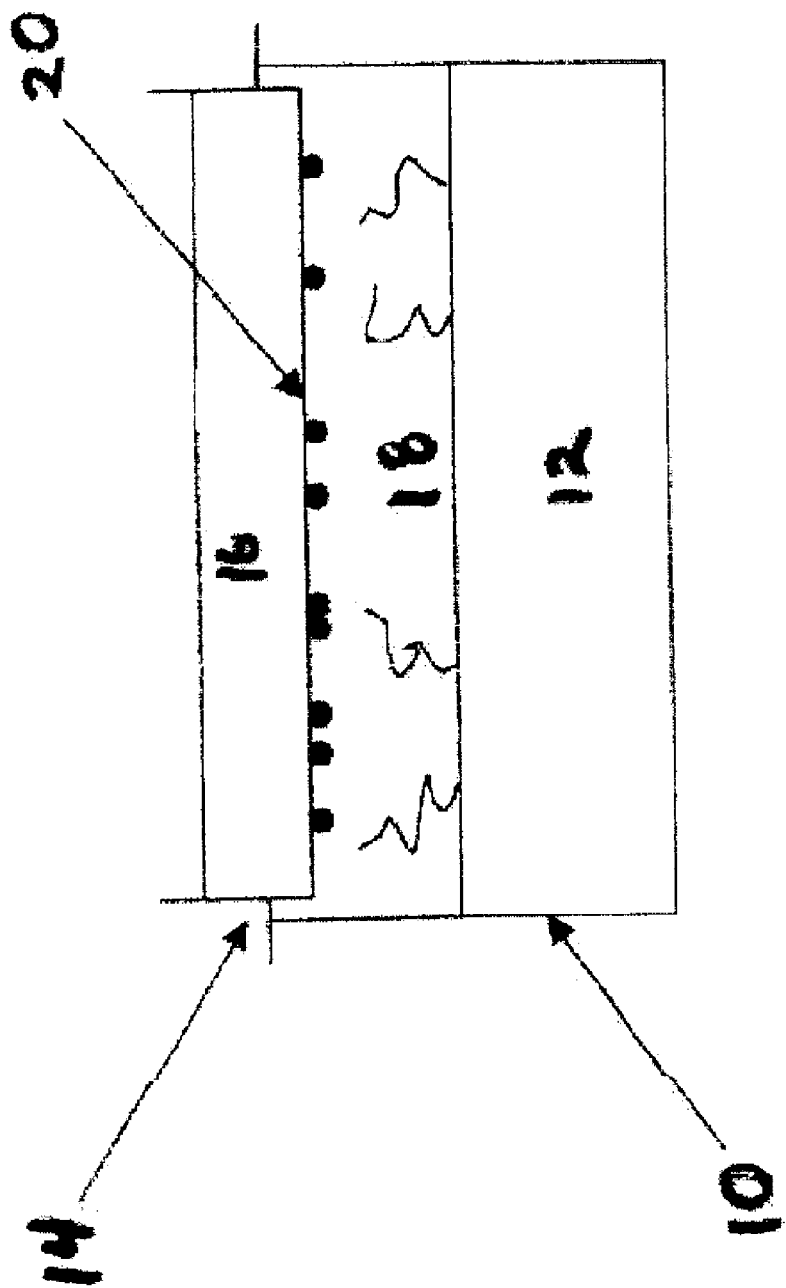
FIG. 1 is a cross sectional view of one embodiment of an apparatus for heating molding compositions in accordance with the present invention.

Repeat use of reference characters in the present specification and drawings is intended to represent same of analogous features the present invention.

DETAILED DESCRIPTION

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

In general, the present invention is directed to molding compositions particularly well adapted for use in bench top molding processes. In accordance with the present invention, the molding composition contains a thermoplastic elastomer. It has been discovered by the present inventor that thermoplastic elastomers provide various advantages over conventionally used materials. For instance, the elastomers are capable of being remelted, which can eliminate large quantities of waste. The elastomers also provide improved mechanical properties. Further, the elastomers are capable of being molded into many complex and unusual shapes.

Although thermoplastic elastomers have been used in a wide variety of applications, the use of such materials in bench-top molding processes presents unique problems which, heretofore, have gone unsolved. Specifically, for such a material to be practical as a pourable molding compound, it must satisfy at least two basic constraints. First, it must possess a sufficiently low melt viscosity (at a temperature suitable for common application) to allow mold filling and the escape of bubbles which become entrapped during mixing and pouring. Second, upon cooling from the melt, the material must display good mechanical toughness and elasticity, sufficient for practical use in articles produced using bench-top techniques.

With careful investigation, a number of basic processing limitations were found for highly plasticized thermoplastic elastomers useful in the present invention. In particular, it was found that, given the typical oils used to plasticize these materials, there is a practical limit to the temperature at which such materials should be melted and poured. Specifically, beyond a particular temperature, it was found that oil degradation and, potentially, polymer degradation, become significant issues.

In one particular embodiment of the present invention, a styrene- ethylene/butylene-styrene (S-EB-S) block copolymer is used in the molding composition. It has been found that this particular thermoplastic elastomer should not be heated to temperatures greater than about 180° C at atmospheric pressure when used in accordance with the present invention. Higher temperatures have been found to discolor the composition and to degrade its elastomeric properties.

Although S-EB-S polymers can be thermoplastically processed at temperatures well beyond 180 degrees Celsius, the relative long term exposure to air dictated by pot melting and molding in bench-top processing can cause problems in some applications. Further, the above thermoplastic elastomers typically need to be combined with a plasticizer, such as mineral oil, when used in a molding composition. Degradation of the plasticizer is also a concern at higher temperatures.

Beside temperature stability, it was also discovered by the present inventor that a molding composition containing a thermoplastic elastomer must have sufficient fluidity to allow bubbles to escape from the composition during cooling.

Although it is difficult to define an exact non-objective requirement for fluidity, it was generally found that bubble free castings could be obtained provided small bubbles rise in the molten material at a sufficiently large rate. To simulate such bubbles, hollow glass spheres, carefully screened within a narrow size, were mixed into the material and the time required for them to rise a specified distance was measured. This measured bubble rise rate was then compared to the rate of rise of the same size bubbles in glycerol at room temperature. In general, glycerol at room temperature has sufficient fluidic properties that would be desired in a molding composition made according to the present invention. Using this method, it was found that the rate of rise of bubbles in the melt should be comparable to the rate of rise of the same size bubble in glycerol at room temperature. Provided this criteria was met, it was found that practically bubble free castings could be achieved and a given formulation could be considered workable.

To accomplish a highly reproducible measurement, raw 3M Scotchlite® hollow glass spheres (product # 10021068789) were first screened to separate only bubbles within a very narrow range of sizes using standard 6 inch testing sieves. Spheres with sizes between tyler equivalent 140 mesh and 200 mesh (106–75 micron) were separated from the bulk powder and only this fraction of spheres was utilized for testing purposes.

To perform a measurement of fluidity on a particular composition in the melt, 0.3 grams of these spheres are placed in a glass vial approximately 0.5 inch in diameter by 2.0 inches in height. This vial is then placed in an oven at a temperature of 175 degrees and allowed to equilibrate for approximately 30 minutes. Once the material is molten, the spheres are thoroughly stirred into the fluid and another equilibration period follows. The fluid is shaken in the vial for final mixing and poured into a preheated identical vial. This vial is observed as the spheres within the fluid move upward from the bottom of the vessel. The time required for the resultant clearing front to move upwards a distance of 0.5 inches is measured and the corresponding drift speed calculated. This value is referred to as the bubble rise rate.

This measurement was carried out using pure glycerin at a temperature of 22 degrees Celsius. The bubble rise rate of glycerin was found to be 0.77 in/hour. Glycerin was chosen as a standard for this purpose based on a very simple criterion. Through investigation with various fluids, it was found that glycerin, when violently shaken and poured into a vessel, would quickly clear entrapped bubbles to result in a solid mass. The dynamics of this process is extremely complex, since the size and distribution of bubbles produced by this type of agitation depends strongly on a number of fluid properties, as does the rate of rise of such bubbles. Whatever the complexities, however, it was found that fluids with significantly slower bubble rise rates than glycerin (at 22 degrees Celsius), begin to retain and entrap bubbles for much longer times, making reasonable to assume similar melts will, correspondingly, display a similar undesirable tendency.

In particular, it was discovered that molding compositions once heated should have a bubble rise rate of at least greater than about one half of the bubble rise rate of glycerin. Specifically, in accordance with the present invention, it was discovered that molding compositions should have a bubble rise rate of at least 0.3 inches per hour when heated. For S-EB-S block copolymers, these measurements can be conducted at a temperature of 175° C. Molding compositions with a higher standard of bubble rise rate than one half the rate of glycerin are considered highly desirable for further evaluation to determine mechanical properties and other over all characteristics. In particular, molding compositions having a bubble rise rate of greater than about 0.3 inches per hour, particularly greater than about 0.5 inches per hour, and more particularly at a bubble rise rate of about 0.7 inches per hour were considered desirable results. Compositions having a bubble rise rate of less than half that of glycerin are largely unacceptable for use as a bench-top molding compound, due to their tendency to entrap and retain air bubbles within castings.

In accordance with the present invention, thermoplastic elastomers were combined with the plasticizer at different levels to determine operability in bench-top molding processes. It was found that highly elastomeric materials were obtained at oil loadings roughly coincident with the bubble fluidity rate outlined above. At higher loadings, however, the result in materials became more susceptible to notch propagation, creep, and generally less acceptable for general molding use. Thus, it was also found that adding too much plasticizer to the elastomeric composition at a certain point produced undesirable results.

The amount of plasticizer added to the thermoplastic elastomer depends primarily on the application and the elastomer used. For many applications, the plasticizer can be present in an amount from about 60% to about 90% by weight.

In general, the viscosity of the molding composition plays an important role in determining the bubble rise rate of the composition. It was discovered, however, that acceptable bubble escape can occur in fluids with significant viscosity.

Whatever the molecular and physical mechanisms that determine the effects of bubble rise rate, the present inventor found that the method outlined provides molding compositions which offer unique utility for bench-top molding applications. Molding compositions meeting the criteria of the present invention can be melted in a simple pot apparatus, gravity poured into a mold, and allowed to cool to produce a substantially bubble free final article. Resulting finished articles possess excellent mechanical properties with, many cases, softness and elongation to break superior to those achievable with standard silicones and urethanes. In addition, since the compositions are thermoplastics, finished articles can be remelted and molded any number of times, allowing cost-effective reuse of material.

As one skilled in the art will recognize, a wide range of thermoplastic elastomer formulations can be optimized according to the methods outlined above. Base polymers can include a wide range of elastomeric materials which experience physical cross-linking and can be plasticized with various types of oil. The base polymer can be a block copolymer of ethylene/butylene or ethylene/propylene with polystyrene end blocks. The many grades of Kraton® G (available from Kraton, Inc.), for example, are generally suited for use in embodiments of the present invention. In addition, other similar elastomeric block copolymers having styrenic end blocks (SIS, SBS, etc.) are suitable for use in various embodiments (although less saturated polymers are less preferred due to issues associated with degradation at high temperature). These may include a wide range of different block structures and morphologies including block tapered structures and star molecular geometries. In general, both the Kraton® G and Kraton® D series of polymers sold by Kraton®, Inc., Santoprene® resins sold by Monsanto, and Norprene® resin sold by Norton, Inc. are all specific examples of similar polymers which can be used to formulate embodiments of the invention.

Beyond block copolymers with polystyrene end groups, other thermoplastic elastomers are also suited for embodiments of the invention. Polyester-based thermoplastic elastomers (such as the series sold by DuPont-Dow elastomers under the trade name Hytrel®) could be optimized according to the methods outlined above to yield embodiments of the invention. In addition, thermoplastic polyurethanes, such as Dow Pellethane resins, could be used. In fact, the general class of thermoplastic elastomers including materials such as EVA (such as DuPont Elvax® resin) could be utilized in specific embodiments. In each case, suitable plasticizing oils should be utilized, according the methods above, to achieve a workable standard bubble rise rate (although the maximum temperature appropriate for long term air exposure must be determined and used to determine standard bubble rise rate at that temperature).

Various blends of different thermoplastic elastomer resins, selected from any of those described above, may also be used as the polymer basis for specific embodiments of the invention. Blends of different molecular weight SEBS rubbers, for example, or even of SEBS rubbers with other polymer families such as polyester based thermoplastic elastomer resins, are viable base materials.

Plasticizing oils that can be used with styrene-ethylene-butylene-styrene block copolymers are comprised of low aromatic content non-napthanic oils. Such oils are available from a variety of sources in grades suitable for food contact. Examples include, but are not limited to, the Duoprime® series of mineral oils sold by Lyondel Lubricants (70 through 500). Less pure non-FDA grades are also suitable for use in embodiments of the invention but are less preferable particularly in applications wherein finished articles are intended for skin contact.

Plasticizers appropriate for use with the broad scope of thermoplastic elastomers are widely available and well known in the art. In general, any system compatible with the polymer chosen for a specific embodiment (providing good plasticization without undesirable plasticization of physical cross-links), and which is stable at temperatures sufficient to achieve a fluidic melt, are viable for use in connection with the present invention. Further, a single plasticizer, or an appropriate mixture of more than one plasticizer, is viable for use in formulating embodiments of the present invention.

The blending of the plasticizer into the polymer to produce a specific molding compound composition may be accomplished through a variety of processing vehicles. These constituents may be blended together by hand or in a suitable powder mixer (a V-blender or similar device) to disperse oil within a powder or other form of the polymer. In many cases, this level of processing is sufficient to provide a raw compound which, although not mixed on a molecular level, will melt in a pot to yield a homogenous product with stirring prior to use. Additional techniques may also be employed to facilitate homogenous mixing, to enable use of specific polymers, or provide a bubble free initial form convenient for pot melting. Such techniques may include, but are not limited to, blending of the constituents within single or twin screw extruders, melt blending and mixing in bulk tanks, and extrusion or casting into prepreg pellets, blocks, tape, etc.

The compositions provided by the invention may incorporate a wide range of additives which enhance various aspects of end performance. Specifically, pigments may be added to impart desired colors and other additives such as UV inhibitors and flame-retardants may be added to meet the needs of specific applications. Waxes may be incorporated to modify surface feel and hardness, and other organic oils or resins may be incorporated for such purposes. In addition, various particulate filler additives may be incorporated to modify surface feel, impart desired physical properties such as higher density, lower density, thermal conductivity, electrical conductivity, etc. The addition of additives should not increase the standard rate of bubble rise for the compounds beyond the limits described, or the resulting compound may have an unacceptable tendency to entrap air bubbles in bench-top molding applications.

In one embodiment, compositions of the invention are formulated such that they are compatible with the pigments utilized in standard wax-based crayons. This is important to provide users with the ability to customize the color of castings. Provided a composition is comprised of polymers and plasticizers which mix with wax at high temperature, the user can generate an extremely large variety of coloration by simply adding crayons to the compound and mixing prior to pouring.

In typical use scenarios, the user will desire to melt the composition in a pot, mix as appropriate, and pour or apply the melt. Since most compositions of the invention may evolve smoke at the required melt temperature, the use of an apparatus to minimize smoke evolution can be utilized. A component of the present invention, therefore, is a pot melting apparatus allowing a user to conveniently utilize the compositions described herein without significant evolution of process smoke.

In the melt, the oils utilized to plasticize most compositions of the present invention display some degree of volatility, having components with vapor pressure sufficient to cause evolution from a hot melt. Upon contact with cool air, this vapor condenses to form extremely small aerosol particles which, in large numbers, form smoke. While this smoke is typically not toxic, and can be tolerated to some extent, it is typically associated with unwanted odors and represents a nuisance and barrier to convenient use.

In order to solve this problem, an apparatus for melting the compositions of the present invention and cools hydrocarbon vapors which evolve from the melt and condenses/entraps them, prior to evolution into the work environment, was developed. In one embodiment, such an apparatus includes an ordinary cooking pot fitted with a specially designed lid. This lid, through a variety of means, is kept cool during operation such that its interior surfaces condense undesirable hydrocarbon vapor to allow the condensate to drip back into the molten compound.

Figure 2:
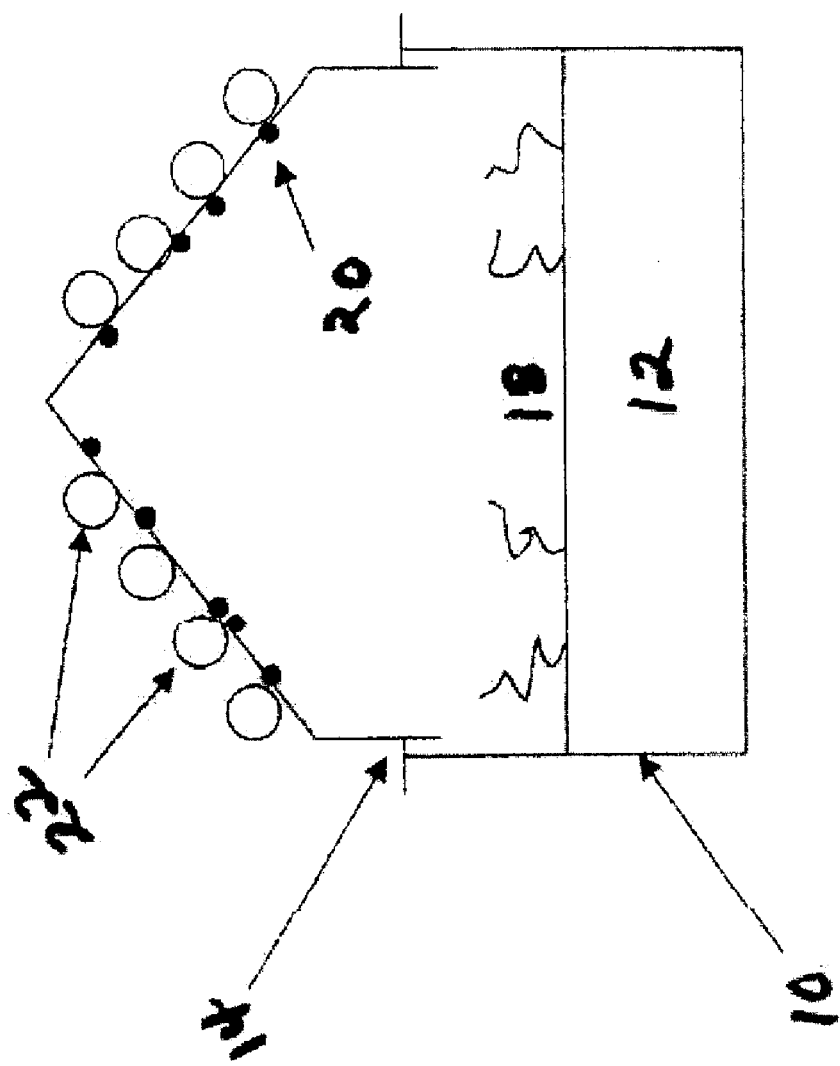
FIG. 2 is a cross sectional view of another alternative embodiment of an apparatus for heating molding compositions in accordance with the present invention.
Figure 3:
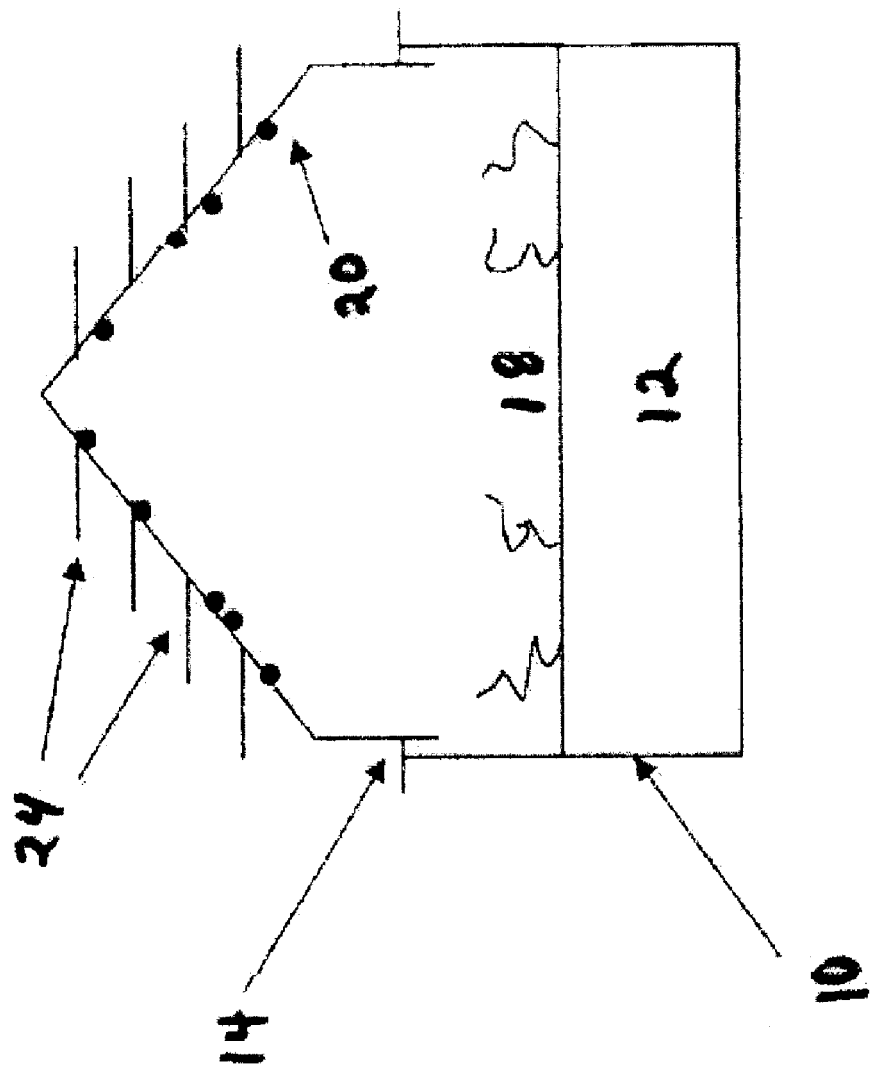
FIG. 3 is a cross sectional view of still another alternative embodiment of an apparatus for heating molding compositions in accordance with the present invention.

FIGS. 1–3 show viable designs for such a lid including a cooling device made in accordance with the present invention. For instance, referring to FIG. 1, a heating vessel 10 is shown containing a molten liquor of heated molding composition 12. The vessel 10 is enclosed by a lid 14. In this embodiment, the lid 14 includes a cooling bath reservoir 16 for containing a cooling fluid, such as water. Hydrocarbon vapor 18 evolving from the molding composition condenses on the bottom surface of the cooled lid 14 to form condensate 20.

Referring to FIG. 2, an alternative embodiment of a lid containing a cooling device is shown. Like reference numerals have been used to indicate similar elements. As shown in this embodiment, lid 14 of the vessel 10 includes a plurality of cooling channels 22 for circulating a cooling fluid, such as water. By circulating a cooling fluid, the cooling channels 22 maintain the lid 14 at a lower temperature and produce a condensate 20.

Referring to FIG. 3, another alternative embodiment of the present invention is shown. In this embodiment, instead of circulating a cooling fluid, the lid 14 includes a plurality of fins 24 which project form the outer surface of the lid. The fins 24 allow convective and radiative cooling of the lid surface causing the condensate 20 to form.

In still a further alternative embodiment of the present invention, the lid 14 of the vessel 10 can include a combination of fins 24 and cooling fluid channels 22.

Various features may be incorporated in the lid design to enhance its utility and optimize its convenient use. These may include, but are not limited to, a stirring mechanism or port to allow the user to insert a stirring device, a port or window for observation of the melt, and a spout or lip to facilitate pouring of the melt with or without the lid in place. In addition, it will be recognized that the lid may be incorporated into the pot as an integral component, or removable.

EXAMPLE 1

A bench-top molding composition based on Kraton® G 1650 thermoplastic elastomer resin (SEBS polymer sold by Kraton® Polymers, Inc.) was formulated according to the methods of the present invention. Lyondel Lubricants, Inc. Duoprime®70 oil was utilized as the plasticizing agent.

In order to determine an appropriate loading of plasticizing oil, according to the methods described above, small samples of compositions with different oil loading were formulated and tested to determine standard bubble rise rate at 175 degrees Celsius.

In each case, the amount of polymer required to produce 100 g of plasticized compound, at the desired loading of oil, was determined. This amount of polymer was added to a sample cup. Oil was then added bringing the total composition weight to 100 g. The resulting compositions were then stirred vigorously to produce a homogenous powder or slurry.

Compositions with four levels of oil loading were produced:

1) 5.0 percent G 1650 resin with 85.0 percent Duoprime® 70 oil by weight
2) 17.5 percent G 1650 resin with 82.5 percent Duoprime® 70 oil by weight
3) 20.0 percent G 1650 resin with 80.0 percent Duoprime® 70 oil by weight
4) 22.5 percent G 1650 resin with 77.5 percent Duoprime® 70 oil by weight A sample from each of these compositions was tested, according to the method described above, to determine the standard rate of bubble rise at 175 degrees Celsius. This resulted in the following data:

| Composition % polymer | Composition % oil | Standard Rate of Bubble Rise (Glycerin at 22 C. = 0.77 in/hour) |
| --- | --- | --- |
| 15.0 | 85.0 | 1.58 in/hour |
| 17.5 | 82.5 | 0.94 in/hour |
| 20.0 | 80.0 | 0.77 in/hour |
| 22.5 | 77.5 | 0.37 in/hour |

This type of data table, mapping standard rate of bubble rise as a function of oil loading, can be used to accurately determine the oil loading required to achieve a standard rate of bubble rise of half that of glycerin (0.385 in/hour). By way of linear interpolation, the above data predicts that this threshold occurs at an oil loading of:

$$\text{loading} = 77.5\% + (0.385 - 0.370)/0.16\% = 77.59\%$$

Based on this result, it is expected that oil loadings above approximately 77.6 percent should yield acceptable molding compounds (provided mechanical characteristics are basically acceptable for use in intended molded articles).

Accordingly, a 78.3 percent by weight oil composition was prepared for testing. A 0.65 lb. quantity of Kraton® G 1650 resin was weighed into a sample bucket and the total weight was increased to 3.00 lb. through the addition of Lyondel Duoprime® 70 oil. This composition was thoroughly blended by hand using a paddle.

A ¾ lb. quantity of this composition was weighed into a stainless steel tray and placed in a laboratory oven preheated to 175 degrees Celsius. The resultant molten liquor was briefly stirred at 10 minute intervals and removed from the oven after 30 minutes.

Two castings were poured using this molten composition. The first mold was a standard 1 ½ inch by 1 inch male to male pipe fitting (providing a complex internal geometry including screw threads). The resultant article was allowed to cool and removed from the mold.

The resultant casting was easily removed from the mold without damage. The material displayed excellent release from the mold and its rubbery character facilitated easy removal. The cast article very accurately reproduced the internal features of the mold including minute surface texture and the internal screw threads. In addition, the casting was optically clear and substantially free of entrapped air voids.

The second casting was poured into a cornbread mold having the complex shape of a corncob approximately 6 inches in length. Again, the resultant casting was easily removed from the mold, substantially free of entrapped bubbles, and reproduced mold features with great accuracy.

Three samples of this composition were further prepared with pigmentation. In each case, a 0.5 gram portion of a standard Crayola® crayon (product code 52-0096) was added to 100 grams of compound. Different color crayons labeled "red," "blue," and "green" were used respectively. The resultant compositions were each placed separately in a Pyrex® saucer and placed in a preheated laboratory oven at 175 degrees Celsius. These were allowed to fluidize and stirred periodically for approximately 30 minutes.

The resultant samples were then removed from the oven and poured into 3 separate molds. A portion of the "red" sample was poured into a rectangular aluminum mold 0.5 inch by 0.5 inch by 2.0 inches. A portion of the "green" sample was poured in a child's mold of a beetle (having various complex features) measuring approximately 1.0 inch by 1.5 inch by 0.25 inches in maximum depth. A portion of the "blue" sample was poured into a child's mold of a spider measuring a width of approximately 2.0 inches by a length of approximately 2.0 inches and a maximum depth of approximately 0.25 inches.

The resultant castings possessed a color consistent with the original crayons (substantially unaltered and indistinguishable on comparison). The color was uniform and somewhat translucent. In addition, the castings were substantially bubble free and easily removed from the molds without damage.

The rectangular "red" sample was pulled to destruction with an elongation to break in excess of 2:1. The hardness of each casting was measured and found to be approximately 1 Shore A. In general, the overall characteristics of the castings were suitable for application in the broad range of intended bench-top molding applications. Certainly, the overall mechanical softness and toughness would make this compound ideal for theatrical props (including masks) and various prototype articles.

EXAMPLE 2

A bench-top molding composition based on Kraton® G 1650 thermoplastic elastomer resin (sold by Kraton Polymers, Inc.) was formulated according to the methods of the present invention. Lyondel Lubricants, Inc. Duoprime® 500 oil was utilized as the plasticizing agent.

In order to determine an appropriate loading of plasticizing oil, according to the methods described above, small samples of compositions with different oil loading were formulated and tested to determine standard bubble rise rate at 175 degrees Celsius.

In each case, the amount of polymer required to produce 100 g of plasticized compound, at the desired loading of oil, was determined. This amount of polymer was added to a sample. Oil was then added bringing the total composition weight to 100 g. The resulting compositions were then stirred vigorously to produce a homogenous powder or slurry.

Compositions with three levels of oil loading were produced:

1) 10.0 percent G 1650 resin with 90.0 percent Duoprime® 500 oil by weight
2) 2.5 percent G 1650 resin with 87.5 percent Duoprime® 500 oil by weight
3) 5.0 percent G 1650 resin with 85.0 percent Duoprime® 500 oil by weight A sample from each of these compositions was tested, according to the method described above, to determine the standard rate of bubble rise at 175 degrees Celsius. This resulted in the following data:

| Composition % polymer | Composition % oil | Standard Rate of Bubble Rise (Glycerin at 22 C. = 0.77 in/hour) |
| --- | --- | --- |
| 10.0 | 90.0 | 2.73 in/hour |
| 12.5 | 87.5 | 1.36 in/hour |
| 15.0 | 85.5 | 0.37 in/hour |

This type of data table, mapping standard rate of bubble rise as a function of oil loading, can be used to accurately determine the oil loading required to achieve a standard rate of bubble rise of half that of glycerin (0.385 in/hour). By way of linear interpolation, the above data predicts that this threshold occurs at an oil loading of:

$$loading = 85.5\% + (0.385 - 0.370)/0.495\% = 85.53\%$$

Based on this result, it is expected that oil loadings above approximately 85.5 percent should yield acceptable molding compounds (provided mechanical characteristics are basically acceptable for use in intended molded articles).

Accordingly, an 85.5 percent by weight oil composition was prepared for testing. A 0.45 lb. quantity of Kraton® G 1650 resin was weighed into a sample bucket and the total weight was increased to 3.10 lb. through the addition of Lyondel Duoprime® 500 oil. This composition was thoroughly blended by hand using a paddle.

A ¾ lb. quantity of this composition was weighed into a stainless steel tray and placed in a laboratory oven preheated to 175 degrees Celsius. The resultant molten liquor was briefly stirred at 10 minute intervals and removed from the oven after 30 minutes.

Two castings were poured using this molten composition. The first mold was a standard 1 ¼ inch by ¾ inch male to male pipe fitting (providing a complex internal geometry including screw threads). The resultant article was allowed to cool and removed from the mold.

The resultant casting was easily removed from the mold without damage. The material displayed excellent release from the mold and its rubbery character facilitated easy removal. The cast article very accurately reproduced the internal features of the mold including minute surface texture and the internal screw threads. In addition, the casting was optically clear and substantially free of entrapped air voids.

The second casting was poured into a cornbread mold having the complex shape of a corncob approximately 6 inches in length. Again, the resultant casting was easily removed from the mold, substantially free of entrapped bubbles, and reproduced mold features with great accuracy.

Three samples of this composition were further prepared with pigmentation. In each case, a 1 gram portion of a standard Crayola crayon (product code 52-0096) was added to 100 grams of compound. Different color crayons labeled "purple pizzazz," "yellow," and "copper" were used respectively. The resultant compositions were each placed separately in a Pyrex® saucer and placed in a preheated laboratory oven at 175 degrees Celsius. These were allowed to fluidize and stirred periodically for approximately 30 minutes.

The resultant samples were then removed from the oven and poured into 3 separate molds. A portion of the "purple pizzazz" sample was poured into a rectangular aluminum mold 0.5 inch by 0.5 inch by 2.0 inches. A portion of the "yellow" sample was poured in a child's mold of a beetle (having various complex features) measuring approximately 1.0 inch by 1.5 inch by 0.25 inches in maximum depth. A portion of the "copper" sample was poured into a child's mold of a spider measuring a width of approximately 2.0 inches by a length of approximately 2.0 inches and a maximum depth of approximately 0.25 inches.

The resultant castings possessed a color consistent with the original crayons (substantially unaltered and indistinguishable on comparison). The color was uniform and somewhat translucent. In addition, the castings were substantially bubble free and easily removed from the molds without damage.

The rectangular "purple pizzazz" sample was pulled to destruction with an elongation to break in excess of 3:1. The hardness of each casting was measured and found to be less than 00 Shore A. In general, the overall characteristics of the castings were suitable for application in the broad range of intended bench-top molding applications. Certainly, the overall mechanical softness and toughness would make this compound ideal for theatrical props (including masks) and various prototype articles.

EXAMPLE 3

A bench-top molding composition based on Kraton® G 1651 thermoplastic elastomer resin (sold by Kraton Polymers, Inc.) was formulated according to the methods of the present invention. Lyondel Lubricants, Inc. Duoprime® 70 oil was utilized as the plasticizing agent.

In order to determine an appropriate loading of plasticizing oil, according to the methods described above, small samples of compositions with different oil loading were formulated and tested to determine standard bubble rise rate at 175 degrees Celsius.

In each case, the amount of polymer required to produce 100 g of plasticized compound, at the desired loading of oil, was determined. This amount of polymer was added to a sample. Oil was then added bringing the total composition weight to 100 g. The resulting compositions were then stirred vigorously to produce a homogenous powder or slurry.

Compositions with three levels of oil loading were produced:

1) 7.5 percent G 1651 resin with 92.5 percent Duoprime® 70 oil by weight
2) 8.6 percent G 1651 resin with 91.4 percent Duoprime® 70 oil by weight
3) 10.0 percent G 1651 resin with 90.0 percent Duoprime® 70 oil by weight A sample from each of these compositions was tested, according to the method described above, to determine the standard rate of bubble rise at 175 degrees Celsius. This resulted in the following data:

| Composition % polymer | Composition % oil | Standard Rate of Bubble Rise (Glycerin at 22 C. = 0.77 in/hour) |
|---|---|---|
| 7.5 | 92.5 | 1.36 in/hour |
| 8.6 | 91.4 | 0.68 in/hour |
| 10.0 | 90.0 | 0.07 in/hour |

This type of data table, mapping standard rate of bubble rise as a function of oil loading, can be used to accurately determine the oil loading required to achieve a standard rate of bubble rise of half that of glycerin (0.385 in/hour). By way of linear interpolation, the above data predicts that this threshold occurs at an oil loading of:

$$loading = 90.0\% + (0.385 - 0.070)/0.436\% = 90.72\%$$

Based on this result, it is expected that oil loadings above approximately 90.7 percent should yield acceptable molding compounds (provided mechanical characteristics are basically acceptable for use in intended molded articles).

In this case, each of the test samples, including that with the highest level of oil, although extremely soft (well under 00 with almost a jelly type of consistency), were quite tough displaying very high elongation to break. Although the bench-top molding applications for such a material would be specialized (due the extreme softness), the toughness permits a wide range of uses. In addition, it is possible to formulate a workable composition toward the higher end of oil loadings (affording a more fluidic melt). Accordingly, a 91.7 percent by weight oil composition was prepared for testing. A 0.25 lb. quantity of Kraton® G 1651 resin was weighed into a sample bucket and the total weight was increased to 3.00 lb. through the addition of Lyondel Duoprime® 70 oil. This composition was thoroughly blended by hand using a paddle.

A ¾ lb. quantity of this composition was weighed into a stainless steel tray and placed in a laboratory oven preheated to 175 degrees Celsius. The resultant molten liquor was briefly stirred at 10 minute intervals and removed from the oven after 30 minutes.

Two castings were then immediately poured using this molten composition. The first mold was a standard 1 inch by ¾ inch male to male pipefitting (providing a complex internal geometry including screw threads). The resultant article was allowed to cool and removed from the mold.

The resultant casting was easily removed from the mold without damage. The material displayed excellent release from the mold and its rubbery character facilitated easy removal. The cast article very accurately reproduced the internal features of the mold including minute surface texture and the internal screw threads. In addition, the casting was optically clear and substantially free of entrapped air voids.

The second casting was poured into a cornbread mold having the complex shape of a corncob approximately 6 inches in length. Again, the resultant casting was easily removed from the mold, substantially free of entrapped bubbles, and reproduced mold features with great accuracy.

Three samples of this composition were further prepared with pigmentation. In each case, a 2 gram portion of a standard crayola crayon (product code 52-0096) was added to 100 grams of compound. Different color crayons labeled "lazer lemon," "shocking pink," and "outrageous orange" were used respectively. The resultant compositions were each placed separately in a Pyrex® saucer and placed in a preheated laboratory oven at 175 degrees Celsius. These were allowed to fluidize and stirred periodically for approximately 30 minutes.

The resultant samples were then removed from the oven and poured into 3 separate molds. A portion of the "laser lemon" sample was poured into a rectangular aluminum mold 0.5 inch by 0.5 inch by 2.0 inches. A portion of the "shocking pink" sample was poured in a child's mold of a beetle (having various complex features) measuring approximately 1.0 inch by 1.5 inch by 0.25 inches in maximum depth. A portion of the "outrageous orange" sample was poured into a child's mold of a spider measuring a width of approximately 2.0 inches by a length of approximately 2.0 inches and a maximum depth of approximately 0.25 inches.

The resultant castings possessed a color consistent with the original crayons (substantially unaltered and indistinguishable on comparison). The color was uniform and somewhat translucent. In addition, the castings were substantially bubble free and easily removed from the molds without damage.

The rectangular "laser lemon" sample was pulled to destruction with an elongation to break in excess of 10:1. The hardness of each casting was found to be well under 00 Shore A with a near jelly-like consistency. In general, the overall characteristics of the castings were suitable for application in certain bench-top molding applications requiring extreme softness. Certainly, the overall mechanical softness and toughness would make this compound ideal for casting of certain types of theatrical props which might need to provide padding or extreme softness, and certain prototype articles.

EXAMPLE 4

A 1 lb. sample the final 91.7 percent by weight oil composition produced in example 3 was weighed into a an 8 inch diameter by 8 inch deep cooking pot and heated on a hot plate. The material quickly produced a liquor which was stirred periodically in the open pot.

A thermocouple was inserted in the liquor and it was heated to a temperature of 175 degrees Celsius. Under these conditions, the open pot evolved some smoke. The pot was covered with the simple lid sold with this type of kitchen pot and, although this lessened the amount of smoke produced, the level was still unacceptable for convenient use.

The pot was then covered with a lid apparatus shown in FIG. 1 wherein the lid surface in contact with the pot interior is cooled from above by a water bath. Water was placed in the lid pan to a depth of ½ inch. This was found to virtually eliminate the evolution of smoke from the system. The material was allowed to remain at high temperature for a period of approximately 30 minutes, during which time no significant smoke evolution was observed.

Following this test, the pot lid was removed and the liquor poured into a hemispherical polished stainless steel bowl. The result was a bubble free hemispherical casting. This casting displayed exactly the same mechanical properties outlined in example 3 and was optically clear.

What is claimed is:

1. A bench-top molding process comprising the steps of;
providing a molding composition, the composition comprising a thermoplastic elastomer and a plasticizer, the thermoplastic elastomer and plasticizer being chosen in selected amounts such that the molding composition, when heated to a temperature sufficient for the composition to be pourable but insufficient to thermally degrade the thermoplastic elastomer or plasticizer, has a bubble rise rate of greater than about 0.3 inches per hour;
heating the molding composition to a temperature sufficient for the composition to be pourable;
pouring the molding composition into a mold to form a casting said molding composition when formed into the casting has a shore A hardness of less than about 5; and
cooling and removing the casting from the mold.

2. A process as defined in claim 1, wherein the molding composition has a bubble rise rate of greater than about 0.5 inches per hour.

3. A process as defined in claim 1, wherein the molding composition is heated to a temperature from about 150° C to about 180° C.

4. A process as defined in claim 1, wherein the molding composition when formed into the casting has a shore A hardness of less than about 2.

5. A process as defined in claim 1, wherein the plasticizer is present in the molding composition in the amount from about 60% by weight to about 95% by weight.

6. A process as defined in claim 1, wherein the plasticizer comprises mineral oil.

7. A process as defined in claim 1, wherein the molding composition has a bubble rise rate from about 0.7 inches per hour to about 3.0 inches per hour.

8. A process as defined in claim 1, wherein the thermoplastic elastomer comprises a styrene-ethylene/propylene-styrene block copolymer, a styrene-isoprene-styrene block copolymer, a styrene-butadiene-styrene block copolymer, a polyetherester, a polyurethane, ethylene vinyl acetate, or mixtures thereof.

9. A process as defined in claim 1, wherein the thermoplastic elastomer comprises a styrene-ethylene/butylene-styrene block copolymer, and wherein the bubble rise rate is measured at a temperature of 175° C.

10. A process as defined in claim 9, wherein the styrene-ethylene/butylene-styrene block copolymer has a molecular weight of from about 100,000 to about 300,000.

11. A process as defined in claim 9, wherein the styrene-ethylene/butylene-styrene block copolymer, contains from about 15% by weight to about 45% by weight polystyrene.

12. A process as defined in claim 1, wherein the molding composition further comprises a pigment.

13. A process as defined in claim 12, wherein the pigment comprises a colored paraffin wax.

14. A process as defined in claim 1, wherein the molding composition is in the form of compounded blocks or pellets prior to being heated.

15. A process as defined in claim 1, wherein the molding composition is in the form of a compounded tape prior to being heated.

16. A process as defined in claim 1, wherein the molding composition further comprises a particulate additive.

17. A bench-top molding process comprising the steps of;

providing a molding composition, the composition comprising a thermoplastic elastomer and a plasticizer, the thermoplastic elastomer comprising a styrene-ethylene/butylene-styrene block copolymer, the thermoplastic elastomer and plasticizer being chosen in selected amounts such that the molding composition has a bubble rise rate of greater than about 0.3 inches per hour when heated to a temperature of 175° C;

heating the molding composition to a temperature sufficient for the composition to be pourable;

pouring the molding composition into a mold to form a casting said molding composition when formed into the casting has a shore A hardness of less than about 2; and cooling and removing the casting from the mold.

18. A process as defined in claim 17, wherein the molding composition, once formed into the casting, has a shore A hardness of less than about 1.

19. A process as defined in claim 17, wherein the molding composition contains the plasticizer in an amount from about 60% by weight to about 95% by weight, the plasticizer comprising mineral oil.

20. A process as defined in claim 17, wherein the molding composition has a bubble rise rate of from about 0.7 to about 3.0 in/hr.

21. A process as defined in claim 17, wherein the styrene-ethylene/butylene-styrene block copolymer has a molecular weight of from about 100,000 to about 300,000.

22. A process as defined in claim 21, wherein the styrene-ethylene/butylene-styrene block copolymer contains polystyrene in an amount from about 15% to about 45% by weight.

23. A process as defined in claim 17, wherein the molding composition further comprises a pigment, the pigment comprising a colored paraffin wax.

* * * * *

UNITED STATES PATENT AND TRADEMARK OFFICE
CERTIFICATE OF CORRECTION

| | | |
|---|---|---|
| PATENT NO. | : 7,045,085 B2 | Page 1 of 1 |
| APPLICATION NO. | : 10/123045 | |
| DATED | : May 16, 2006 | |
| INVENTOR(S) | : Stephen P. Sutton | |

It is certified that error appears in the above-identified patent and that said Letters Patent is hereby corrected as shown below:

Abstract reads "A bench-top molding process is disclosed in combination with an apparatus designed to heat a molding composition. In accordance with the present invention, the molding composition contains a thermoplastic elastomer and a plasticizer. The thermoplastic elastomer can be, for instance, a styrene-ethylene/butylene-styrene block copolymer. The plasticizer, on the other hand, can be mineral oil. The block copolymer can be chosen in conjunction with the plasticizer so as to have a bubble rise rate when heated equal to at least one half of the bubble raise rate of glycerin at room temperature. By having a bubble rise rate in the above range, it has been found that no significant amounts of air will be trapped in the molding composition when formed into a casting." should read --A bench-top molding process is disclosed in combination with an apparatus designed to heat a molding composition. In accordance with the present invention, the molding composition contains a thermoplastic elastomer and a plasticizer. The thermoplastic elastomer can be, for instance, a styrene-ethylene/butylene-styrene block copolymer. The plasticizer, on the other hand, can be mineral oil. The block copolymer can be chosen in conjunction with the plasticizer so as to have a bubble rise rate when heated equal to at least one half of the bubble rise rate of glycerin at room temperature. By having a bubble rise rate in the above range, it has been found that no significant amounts of air will be trapped in the molding composition when formed into a casting.--

Col. 16, l. 23 reads "... casting said molding composition when formed into the ..." should read --casting, said molding composition when formed into the ...--

Col. 17, l. 15 reads "... casting said molding composition when formed into the ..." should read --casting, said molding composition when formed into the ...--

Signed and Sealed this

Twenty-sixth Day of June, 2007

JON W. DUDAS
*Director of the United States Patent and Trademark Office*